United States Patent [19]

Merrick et al.

[11] Patent Number: 5,560,565
[45] Date of Patent: Oct. 1, 1996

[54] DUAL SPOOL RETRACTOR

[75] Inventors: David D. Merrick; Jeffrey E. Peterson, both of Indianapolis, Ind.

[73] Assignee: Indiana Mills & Manufacturing, Inc., Westfield, Ind.

[21] Appl. No.: 423,638

[22] Filed: Apr. 17, 1995

[51] Int. Cl.⁶ .................... B60R 22/353; B60R 22/10
[52] U.S. Cl. ................. 297/476; 242/378.4; 242/382.1
[58] Field of Search .................... 242/378.4, 382.1, 242/382.2, 382.4; 297/469, 468, 474, 475, 476, 477; 280/807, 808, 806

[56] References Cited

U.S. PATENT DOCUMENTS

| | | | |
|---|---|---|---|
| 2,825,581 | 3/1958 | Knight | 242/378.4 |
| 3,944,163 | 3/1976 | Hayashi et al. | 242/382.1 |
| 4,427,164 | 1/1984 | Rumpf | 242/378.4 |
| 4,720,148 | 1/1988 | Anthony et al. | 297/474 |
| 4,765,558 | 8/1988 | Higbee | 242/378.4 |
| 4,886,315 | 12/1989 | Johnson | 297/476 |
| 5,286,090 | 2/1994 | Templin et al. | 297/473 |

Primary Examiner—John M. Jillions
Attorney, Agent, or Firm—Woodard, Emhardt, Naughton Moriarty & McNett

[57] ABSTRACT

A dual spool retractor. A pair of belt spools are rotatably mounted to a frame having the same axis of rotation. Springs urge the spools to retract each belt. A single pawl is engageable with teeth of each spool to limit spool rotation and belt extension. The pawl is spaced apart from the teeth by belt followers until both belts are extended from each spool. The retractor is combined with a vehicle child seat.

19 Claims, 4 Drawing Sheets

5,560,565

1
DUAL SPOOL RETRACTOR

BACKGROUND OF THE INVENTION

1. Field of the Invention

This invention is in the field of retractors for use in storing webs or belts utilized in vehicle restraint systems.

2. Description of the Prior Art

Vehicle restraint systems for children may either be integrated with the regular passenger seat or may be provided by means of an auxiliary seat positioned atop the regular passenger seat. In either case, a pair of belts are pulled outwardly from the seat and over the child with a tongue or a pair of tongues mounted to the belts lockingly engageable with a seat belt buckle positioned adjacent the child's legs. One such child's seat is shown in the commonly owned U.S. Pat. No. 5,286,090.

Various mechanisms are used for mounting the belts to the seat. For example, one common technique is to attach the ends of the belt behind the seat to a bar, in turn, attached to a single web wound on a retractor located behind or beneath the seat, such as shown in the commonly owned U.S. Pat. No. 4,720,148. Another technique is to eliminate the bar attached to the pair of belts and instead provide a single retractor having a pair of spools attached together to rotate at all times together with each spool wrappingly receiving a separate belt.

It is the practice to use an automatic locking type retractor in combination with the child restraint system. The retractor spool will automatically lock once sufficient amount of web is extended and then slightly retracted. Thus, when utilizing a child restraint system having a pair of belts each of which has a separate tongue, the retractor will automatically lock once the first belt is pulled outwardly and slightly released upon locking of the tongue to the buckle. Since the retractor spool is locked, it is not possible to fully pull outwardly the second belt to facilitate locking of the second tongue to the buckle. Disclosed herein is a child restraint system having a dual spool retractor with each retractor spool operating independently and with a single pawl lock for simultaneously locking both spools once a sufficient amount of belt has been extended from both of the spools.

SUMMARY OF THE INVENTION

One embodiment of the present invention is a retractor comprising a frame with a first spool and a second spool rotatably mounted to the frame so the spools are rotatable independently of each other. A first web and a second web are wound on the spools and are retractable and extendable therefrom. An automatic locking pawl is engageable with the spools and has unlocked and locked positions. The pawl when in the unlocked position allows extension and retraction of the first web while the second web remains retracted. The pawl when in the locked position locks and limits rotation of the spools only when both the second web is extended from the second spool and the first web is extended from the first spool.

It is an object of the present invention to provide a new and improved child restraint system.

A further object of the present invention is to provide a vehicle child restraint system having a dual spool retractor controlling belt extension and retraction.

2

An additional object of the present invention is to provide a vehicle child seat having a pair of belts with individual tongues lockable with a seat belt buckle wherein both belts must be extended prior to being locked in position.

Related objects and advantages of the present invention will be apparent in the following description.

DESCRIPTION OF THE PREFERRED EMBODIMENT

Figure 1:
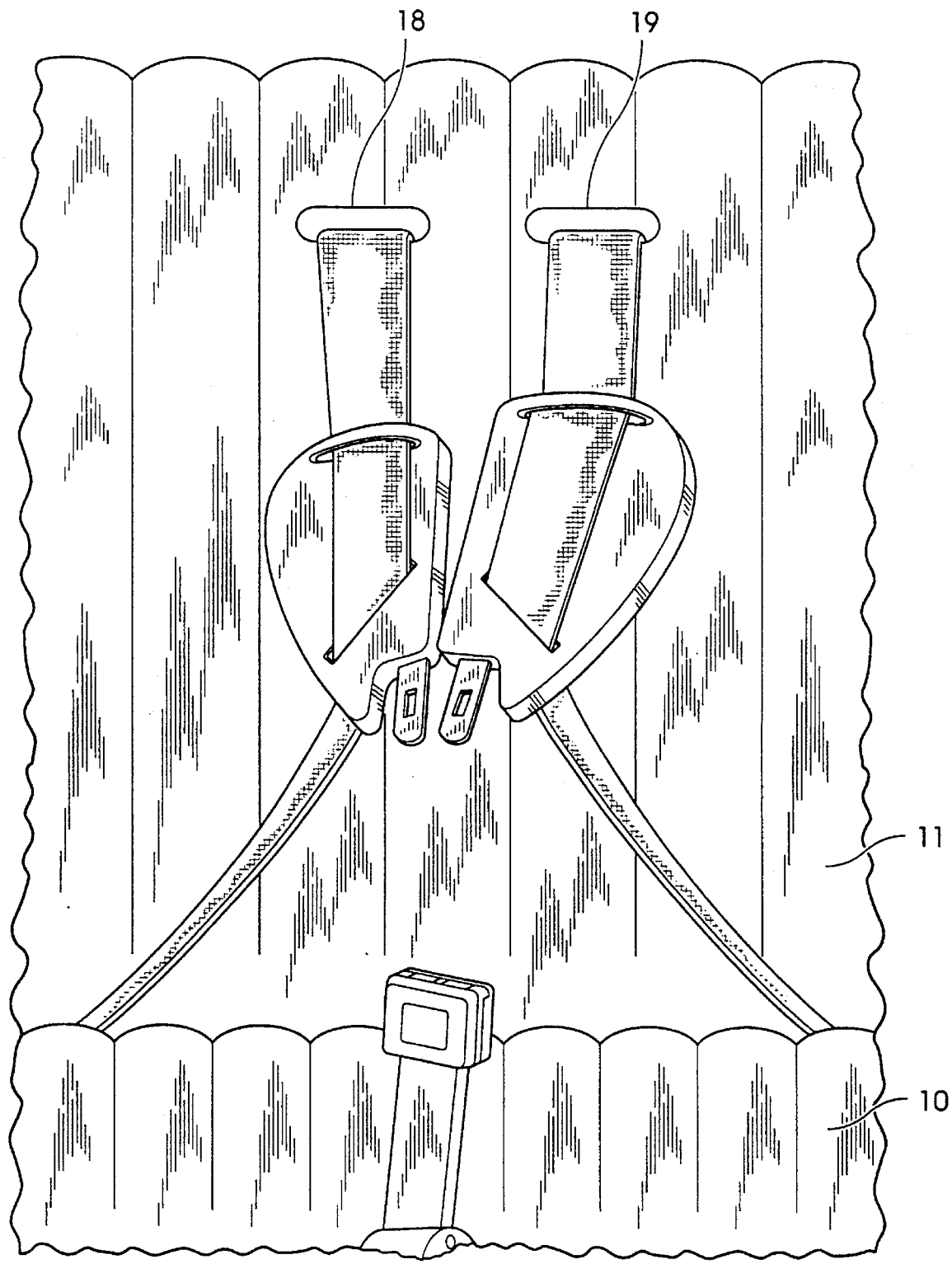
FIG. 1 is a fragmentary front view of a vehicle child seat.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a child's composed of a generally horizontally extending seat 10 upon which a child may sit and a generally vertically extending seat back 11 positioned adjacent seat 10 and against which the child may rest. Seat 10 and seat back 11 are conventional in design and may either take the form of an integrated child seat built into the regular passenger seat within the vehicle or the form of an auxiliary child seat removably positioned atop the regular passenger seat. Both the integrated child seat design and the auxiliary child seat are well known and thus are not detailed herein. An example of an auxiliary child seat is shown in the aforementioned U.S. Pat. No. 4,720,148 which is herewith incorporated by reference.

Figure 2:
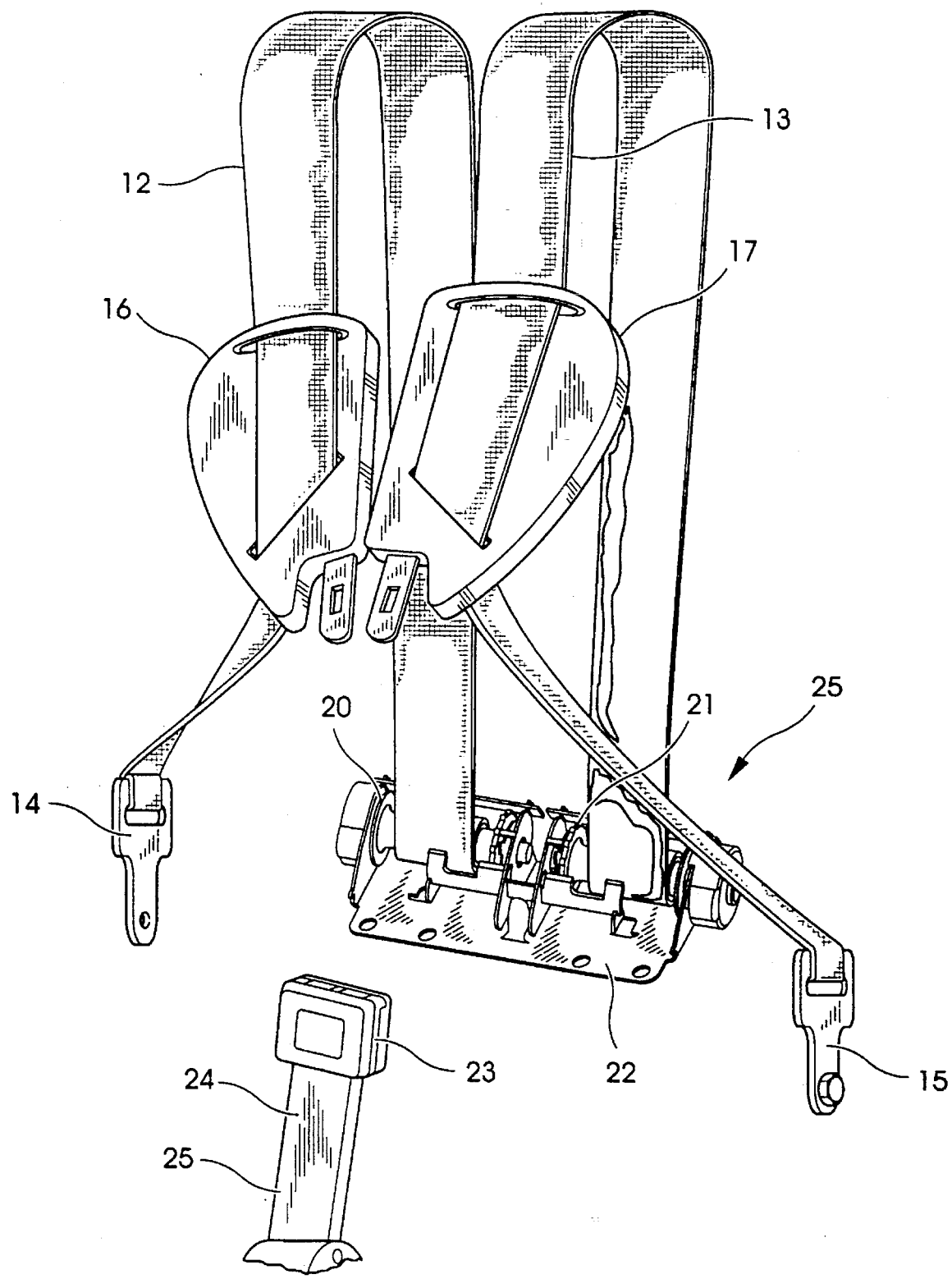
FIG. 2 is a perspective view of the locking mechanism, retractor and associated belts of FIG. 1 with the seat removed for purposes of clarity.

A pair of webs or belts 12 and 13 (FIG. 2) have distal ends fixedly secured to the seat frame or the vehicle frame by brackets 14 and 15. The belts extend upwardly respectively through a pair of tongues 16 and 17 and further respectively through a pair of slots 18 and 19 (FIG. 1) formed in seat back 11. The belts extend downwardly behind the seat back where they are individually wrapped on a pair of spools 20 and 21 rotatably mounted to retractor frame 22, in turn, fixedly mounted to the seat frame or vehicle frame with spools 20 and 21 as well as the retractor frame 22 being concealed from view by seat 10 and seat back 11. A conventional seat belt buckle 23 is mounted by means of member or web 24 having its bottom end 25 secured to the seat frame or vehicle frame. Buckle 23 is releasably lockable with tongues 16 and 17. The buckle may lock individually to a single tongue 16 or 17 even though only one tongue is inserted into the buckle.

In operation, the child is positioned atop seat 10 with belt 13 then being pulled outwardly allowing tongue 17 to be locked to buckle 23. Belt 12 may then be pulled outwardly allowing tongue 16 to be locked to the buckle. Each tongue 16 and 17 includes a main frame through which the belt is slidably adjustable allowing the positioning of the tongue at different locations along the length of the belt. Likewise, each tongue includes a downwardly extending tongue bar having an aperture to lock with the latch within the buckle. The construction of buckle 23 as well as the construction of tongues 16 and 17 are quite well known.

The retractor 25 includes retractor frame 22 (FIG. 3) having four upwardly turned walls 26, 27, 28 and 29 integrally connected together. A first strengthening rib 30 is connected to and extends between walls 26 and 27 whereas a second strengthening rib 31 is connected to and extends between walls 28 and 29. Spool 20 is rotatably mounted to walls 26 and 27 whereas spool 21 is rotatably mounted to walls 28 and 29. Belts 12 and 13 have been removed from the spools of FIG. 3 in order to more clearly illustrate the construction of the retractor. The axle 32 of spool 20 extends through walls 26 and 27 but is spaced apart from axle 33 of spool 21 which extends through walls 28 and 29. A conventional spring enclosed within spring housing 34 has its opposite ends connected to wall 29 and axle 33 and is arranged to cause the spool to rotate in a direction to retract belt 13 on the spool but is yieldable to allow belt 13 to be extended therefrom. In a similar manner, a spring contained within housing 36 has its opposite ends attached to and between wall 26 and axle 32 and is operable to rotate spool 20 to retract belt 12 but is yieldable to allow belt 12 to be extended therefrom.

Pawl 40 is pivotally mounted to a pair of upstanding pawl brackets 41 and 42 integrally secured to frame 22. Pawl 40 is a single member and extends from bracket 41 through slot 43 of wall 27 and then through slot 44 of wall 28 to bracket 42. The opposite ends of pawl 40 form belt follower 45 and belt follower 46. Follower 45 contacts or engages belt 12 when the belt is fully wrapped on spool 20 whereas follower 46 contacts belt 13 when the belt is fully wrapped on spool 21. When each belt is fully wrapped on each spool, belt followers 45 and 46 cause the pawl to be in an outer position spaced apart from the spool ratchet wheels thereby preventing either spool from locking.

Spool 20 includes an end wall 47 and a ratchet shaped end wall 48 fixedly mounted to the spool hub, in turn, secured to rotate with spool axle 32. Likewise, spool 21 includes a spool end wall 50 and a ratchet shaped end wall 51 mounted to rotate with spool hub 52, in turn, secured to and rotatable with axle 33. Ratchet walls 48 and 51 include respectively teeth 53 and 54 formed on the outer circumferentially extending edge of the walls and are positioned to respectively engage the outwardly projecting arms 55 and 56 of pawl 40. Helical spring 80 contained within spring housing 81 secured to frame 22 has an outer end contactable against pawl 40 with spring 80 normally urging pawl 40 toward the spools causing arms 55 and 56 to lockingly engage teeth 53 and 54 limiting rotational motion of the spools assuming sufficient belt has been withdrawn from the spools to allow belt followers 45 and 46 to pivot further inward.

A pair of clutch plates 60 and 61 are mounted respectively to axles 32 and 33. Clutch plate 60 is positioned between ratchet end wall 48 and wall 27 whereas clutch plate 61 is located between ratchet end wall 51 and end wall 28. Clutch plate 60 and 61 are identical and thus the following description of plate 60 will apply equally to plate 61. Clutch plate 60 is mounted to frame 22 and more specifically to axle 32.

Figure 5:
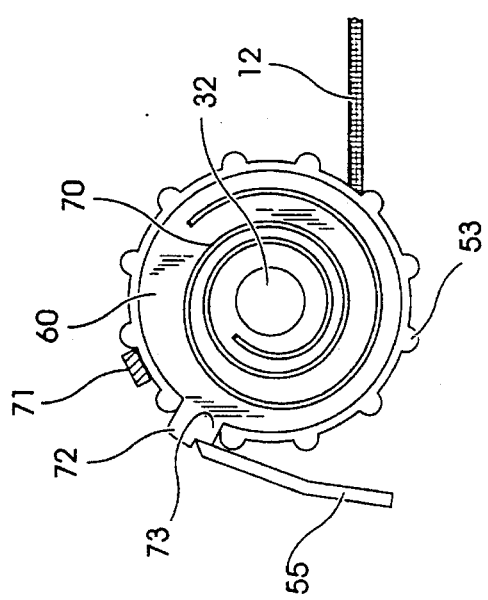
FIG. 5 is the same view as FIG. 4 only showing the pawl locked to the clutch plate.

The plate will slip relative to the rotation of spool 20; however, a spiral spring 70 (FIG. 5) mounted between plate 60 and wall 27 normally urges plate 60 against ratchet end wall 48 thereby causing the clutch plate through its frictional engagement with end wall 48 to rotate with spool 20. Spring 70 is yieldable to allow slippage between clutch plate 60 and ratchet end wall 48, whenever the plate is held stationary either by pawl arm 55 or stop bracket 71 fixedly mounted to wall 27.

Figure 6:
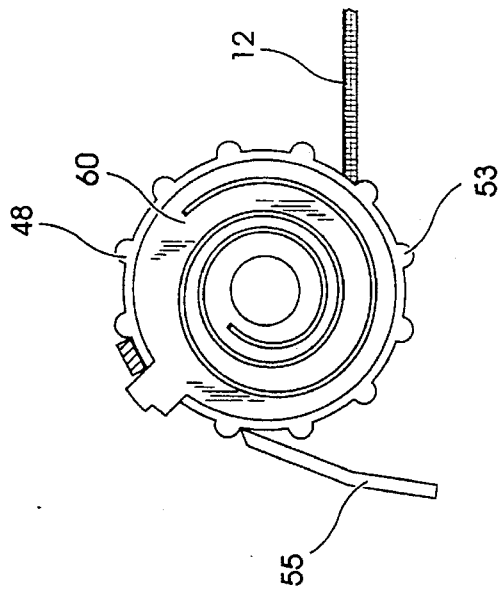
FIG. 6 is the same view as FIG. 4 only showing the pawl locked to the ratchet end wall.

Plate 60 includes an outwardly extending lug 72 with an indented stop surface 73 formed thereon. Lug 72 extends outwardly beyond the outside diameter of the fully wrapped belt and arm 55 when the belt is fully wrapped on the spool. As belt 12 is unwound, the plate with lug 72 rotate with the spool until eventually lug 72 contacts arm 55 limiting further rotation of plate 60 even though the spool continues to rotate as the belt is further extended. With belt 12 (FIG. 4) fully wrapped on spool 20, belt follower 45 engages the belt roll forcing the pawl 40 and pawl arm 55 outwardly spacing arm 55 apart from teeth 53. As the belt 12 is initially unwound from spool 20, ratchet end wall 48 along with clutch plate 60 rotate in a counterclockwise direction as viewed in FIG. 4 moving lug 72 toward arm 55. As belt 12 is unwound, thereby decreasing the belt roll diameter and assuming belt 13 has been previously extended with tongue 17 locked to buckle 23, pawl arm 55 pivots inwardly while simultaneously lug 72 rotates from a position contacting stop 71 (FIG. 4) to the pawl engaging position of FIG. 5, thereby contacting stop surface 73 against the tip of arm 55. Stop surface 73 is located outwardly of teeth 53 preventing contact between pawl arm 55 and ratchet end wall 48. When belt 12 is slightly retracted, ratchet end wall 48 and clutch plate 60 rotate in a clockwise direction from a position illustrated in FIG. 5 to a position illustrated in FIG. 6 moving surface 73 apart from arm 55 and allowing pawl arm 55 to pivot further inward engaging teeth 53 of ratchet end wall 48. Further, belt extension is prevented since pawl arm 55 rests against teeth 53 preventing counterclockwise rotation of ratchet end wall 48 as illustrated in FIG. 6. The belt may be wound back fully on to the spool until eventually belt follower 45 forces pawl arm 55 outwardly.

Figure 3:
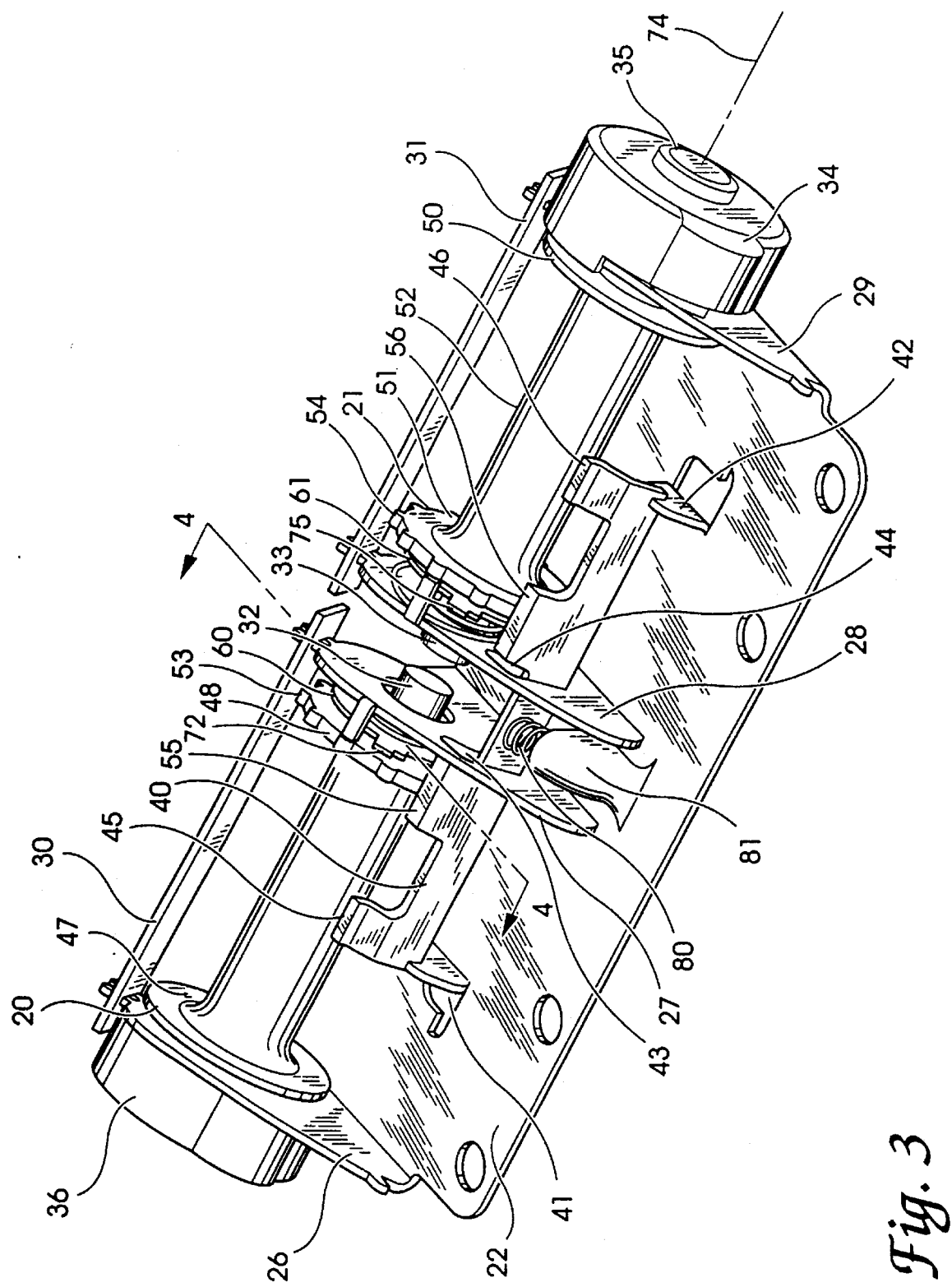
FIG. 3 is a perspective view of the retractor of FIG. 2.

Clutch plate 61 is mounted between ratchet end wall 51 and wall 28 and rotates with spool 52 on axle 33 operating in a manner identical to the operation of clutch plate 60. Both spools and clutch plates are positioned on the same axis of rotation 74 which extends through the center 35 of the axles (FIG. 3). The spring contained within housings 34 and 36 allow each spool to retract the webs independent of movement of each other. In order for retractor 25 to lock and prevent extension of belts 12 and 13, both spools must rotate from the pawl engaging position of FIG. 5 wherein stop surface 73 of lugs 72 and 75 (FIG. 3) are engaged with pawl arms 55 and 56 to the position of FIG. 6 wherein both clutch plate lugs are spaced apart from pawl arms 55 and 56. Thus, both webs must first be extended sufficiently to allow pawl arms 55 and 56 to engage the clutch plates and then secondly both belts must be slightly retracted allowing pawl arms 55 and 56 to move apart from the clutch plates and engage teeth 53 and 54 or ratchet spool end walls 48 and 51.

Figure 4:
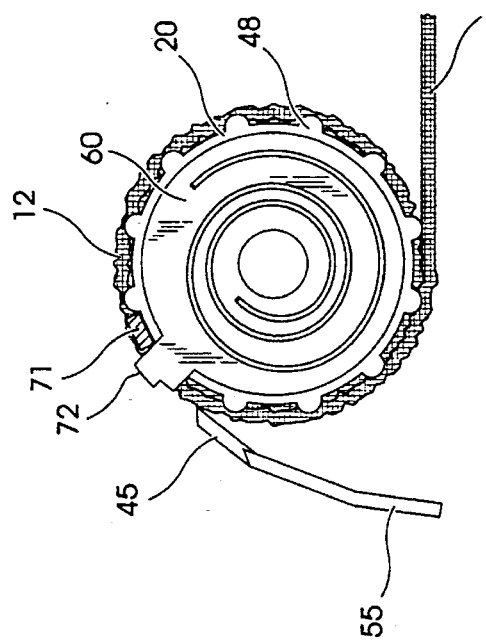
FIG. 4 is an enlarged cross sectional view taken along the line 4—4 of FIG. 3 and viewed in the direction of the arrows illustrating the belt fully wrapped on the spool.

Pawl 40 is engageable with both spools and has an unlocked position depicted in FIG. 4 and a locked position depicted in FIG. 6. The pawl when in the unlocked position is operable to allow movement of one of the belts to the extended position thereby allowing engagement of one of the tongues with buckle 23 while the remaining belt remains in the retracted position. Once the second belt is extended and slightly retracted, thereby positioning both belts in the extended position, the pawl moves to the locked position of FIG. 6 limiting rotation of both spools. Belt followers 45 and 46 hold pawl 40 apart from ratchet wheels 48 and 51 so long as the belt followers are located in their outward position caused by either belt 12 or belt 13 being fully retracted. Each spool thereby functions as an automatic locking retractor.

Many variations are contemplated and included in the present invention. For example, the dual spool retractor is shown in the drawings as combined with a five point child seat. That is, the buckle is mounted at the first point whereas each belt has opposite ends mounted at a pair of points. The retractor may also be used with a three point child seat. That is, the buckle may be mounted at a first point with each belt having a proximal end mounted at the point of the spool and with the opposite distal end of each belt having a tongue mounted thereon. In lieu of a split tongue arrangement as shown in FIG. 1, the dual spool retractor may also be combined with a single shield mounted to botch belts with the shield having a single buckle thereon lockingle, engageable with a single tongue mounted to belt 24 (FIG. 2) in lieu of buckle 23. The later system would therefore be a five point child seat having a non-split shield with the buckle slidably adjustable thereon.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A retractor comprising:

a frame;

a first spool rotatably mounted to said frame;

a second spool rotatably mounted to said frame with said first spool and said second spool mounted to said frame so said first spool and said second spool are rotatable independently of each other;

a first web wound on said first spool retractable and extendable therefrom;

a second web wound on said second spool retractable and extendable therefrom; and, automatic locking means engageable with said first spool and said second spool and having an unlocked position and a locked position, said automatic locking means when in said unlocked position operable to allow extension and retraction of said first web while said second web remains retracted, said automatic locking means when in said locked position being operable to lock and limit rotation of said spools only when both said second web is extended from said second spool and said first web is extended from said first spool.

2. The retractor of claim 1 wherein:

said first spool includes a first ratchet wheel with outwardly extending first teeth rotatable therewith, said second spool includes a second ratchet wheel with outwardly extending second teeth rotatable therewith; and, said automatic locking means includes:

a pawl movably mounted to said frame and movable against said first ratchet wheel and said second ratchet wheel to engage said first teeth and said second teeth to limit rotation of said first spool and said second spool; and, a first spring engaged with said pawl and operable to normally bias said pawl against said first ratchet wheel and said second ratchet wheel but yieldable to allow said pawl to move apart from said first ratchet wheel and said second ratchet wheel.

3. The retractor of claim 2 wherein:

said retractor is an automatic locking retractor, said automatic locking means includes a first clutch plate mounted to said frame to rotate with said first spool between a first pawl engaging position and a position spaced apart from said pawl and a second clutch plate mounted to said frame to rotate with said second spool between a second pawl engaging position and a position spaced apart from said pawl, said automatic locking means operable to limit rotation of said first spool and said second spool only when said first web and said second web have been extended and partially retracted rotating said first clutch plate and said second clutch plate respectively from said first pawl engaging position and said second pawl engaging position.

4. The retractor of claim 3 and further comprising:

a second spring and a third spring mounted to said frame and engaged respectively with said first spool and said second spool normally urging respectively said first spool to retract said first web and said second spool to retract said second web but yieldable to allow respectively extension of said first web and extension of said second web.

5. The retractor of claim 3 wherein:

said automatic locking means includes a fourth spring and a fifth spring positioned respectively between said frame and said first clutch plate and between said frame and said second clutch plate to normally urge respectively said first clutch plate against said first ratchet wheel to rotate therewith and said second clutch plate against said second ratchet wheel to rotate therewith but yieldable to allow independent rotation of said first ratchet wheel with respect to said first clutch plate and independent rotation of said second ratchet wheel with respect to said second clutch plate; and, said frame includes stop means to limit rotation of said first clutch plate and said second clutch plate.

6. The retractor of claim 3 wherein:

said first spool and said second spool have the same axis of rotation with said first clutch plate and said second clutch plate positioned on said axis of rotation between said first ratchet wheel and said second ratchet wheel.

7. The retractor of claim 3 wherein:

said pawl includes a first web follower and a second web follower engageable respectively with said first web and said second web when fully retracted on said first spool and said second spool with said first web follower and said second web follower holding said pawl apart from said first ratchet wheel and said second ratchet wheel so long as either said first web or said second web is retracted.

8. A retractor comprising:

a frame;

a first spool rotatably mounted to said frame, said first spool including a first ratchet wheel with outwardly extending first teeth rotatable therewith,;

a second spool rotatably mounted to said frame with said first spool and said second spool mounted to said frame so said first spool and said second spool are rotatable independently of each other, said second spool includes a second ratchet wheel with outwardly extending second teeth rotatable therewith;

a first web wound on said first spool retractable and extendable therefrom;

a second web wound on said second spool retractable and extendable therefrom;

a pawl movably mounted to said frame and movable against said first ratchet wheel and said second ratchet wheel to engage said first teeth and said second teeth to limit rotation of said first spool and said second spool, said pawl including extensions forming a first web follower and a second web follower engageable respectively with said first web and said second web when fully retracted on said first spool and said second spool with said first web follower and said second web follower holding said pawl apart from said first ratchet wheel and said second ratchet wheel so long as either said first web or said second web follower is retracted; and, a first spring engaged with said pawl and normally biasing said pawl against said first ratchet wheel and said second ratchet wheel to lock and limit rotation of said first spool only when both said second web is extended from said second spool and said first web is extended from said first spool but yieldable to allow said pawl to move apart from said first ratchet wheel and said second ratchet wheel to allow extension and retraction of said first web while said second web remains retracted.

9. The retractor of claim 8 wherein:

said pawl is a single member pivotally mounted to said frame and extending past and adjacent said first ratchet wheel and said second ratchet wheel.

10. The retractor of claim 8 wherein:

said retractor is an automatic locking retractor and further comprises a first clutch plate mounted to said frame to rotate with said first spool between a first pawl engaging position and a position spaced apart from said pawl and a second clutch plate mounted to said frame to rotate with said second spool between a second pawl engaging position and a position spaced apart from said pawl, said first clutch plate and said second clutch plate when in said first pawl engaging position and said second pawl engaging position spacing said pawl apart from said first ratchet wheel and said second ratchet wheel allowing rotation of said first spool and said second spool until said first web and said second web have been extended and partially retracted rotating said first clutch plate and said second clutch plate respectively from said first pawl engaging position and said second pawl engaging position to a position apart from said pawl.

11. The retractor of claim 10 and further comprising:

a second spring and a third spring mounted to said frame and engaged respectively with said first spool and said second spool normally urging respectively said first spool to retract said first web and said second spool to retract said second web but yieldable to allow respectively extension of said first web and extension of said second web.

12. The retractor of claim 11 wherein:

said automatic locking means includes a fourth spring and a fifth spring positioned respectively between said frame and said first clutch plate and between said frame and said second clutch plate to normally urge respectively said first clutch plate against said first ratchet wheel to rotate therewith and said second clutch plate against said second ratchet wheel to rotate therewith but yieldable to allow independent rotation of said first ratchet wheel with respect to said first clutch plate and independent rotation of said second ratchet wheel with respect to said second clutch plate; and, said frame includes stop means to limit rotation of said first clutch plate and said second clutch plate.

13. The retractor of claim 12 wherein:

said first spool and said second spool have the same axis of rotation with said first clutch plate and said second clutch plate positioned on said axis of rotation between said first ratchet wheel and said second ratchet wheel.

14. A vehicle child seat comprising:

a frame;

a generally horizontally extending seat upon which a child may sit;

a generally vertically extending seat back adjacent said seat against which said child may be supported;

a pair of webs extending from in front of said seat back to behind said seat back;

a pair of seat belt buckle first locks each mounted to one of said webs in front of said seat back;

a seat belt buckle second lock mounted adjacent said seat and releasably lockable individually with said pair of seat belt buckle first locks;

a pair of spools rotatably mounted to said frame and concealed by said seat and seat back, said spools each having wound thereon one of said webs, said webs having a retracted position wherein said webs are fully wound on said spools and further an extended position wherein said webs are pulled outwardly and extended from said spools to allow said first locks to engage said second lock;

spring means connected to said spools and operable to normally urge said webs to be retracted on said spools independently of each other but yieldable to allow said webs to be extended independently of each other; and, pawl means engageable with said spools and having an unlocked position and a locked position, said pawl means when in said unlocked position operable to allow movement of one of said webs to the extended position allowing engagement of one of said first locks with said second lock while the remaining one of said webs remains in the retracted position, said pawl means when in said locked position being operable to lock and limit rotation of said spools only when both webs are extended from both of said spools.

15. The vehicle child seat of claim 14 and further comprising:

a first clutch plate mounted to said frame to rotate with one said spools between a first pawl engaging position and a position spaced apart from said pawl means and a second clutch plate mounted to said frame to rotate with the other of said spools between a second pawl engaging position and a position spaced apart from said pawl means, said first clutch plate and said second clutch plate limit rotation of said spools only when both webs have been extended and partially retracted rotating said first clutch plate and said second clutch plate respectively from said first pawl engaging position and said second pawl engaging position.

16. The vehicle child seat of claim 15 wherein:

said pawl means includes a single member pivotally mounted to said frame and extending past and adjacent both of said spools.

17. The vehicle child seat of claim 16 wherein:

said spools have the same axis of rotation with said first clutch plate and said second clutch plate positioned on said axis of rotation.

18. A vehicle child seat comprising:

a frame;

a generally horizontally extending seat upon which a child may sit;

a generally vertically extending seat back adjacent said seat against which said child may be supported;

a pair of webs extending from in front of said seat back to behind said seat back;

first lock means mounted to said webs in front of said seat back;

a second lock mounted adjacent said seat and releasably lockable with said first lock means;

a pair of spools rotatably mounted to said frame and concealed by said seat and seat back, said spools each having wound thereon one of said webs, said webs having a retracted position wherein said webs are fully wound on said spools and further an extended position wherein said webs are pulled outwardly and extended from said spools to allow said first lock means to engage said second lock;

spring means connected to said spools and operable to normally urge said webs to be retracted on said spools independently of each other but yieldable to allow said webs to be extended independently of each other; and, pawl means engageable with said spools and having an unlocked position and a locked position, said pawl means when in said unlocked position operable to allow movement of one of said webs to the extended position while the remaining one of said webs remains in the retracted position, said pawl means when in said locked position being operable to lock and limit rotation of said spools only when both webs are extended from both of said spools.

19. The child seat of claim 18 and further comprising:

shield means mounted to said webs, said first lock means mounted to said shield means.

* * * * *